United States Patent [19]

Volk et al.

[11] Patent Number: 5,284,388
[45] Date of Patent: Feb. 8, 1994

[54] RECEIVER WITH DUST COLLECTOR FOR BULK DRY INGREDIENTS

[75] Inventors: Benjamin L. Volk; Joseph A. Volk, Jr., both of Creve Coeur, Mo.

[73] Assignee: Beta Raven Inc., Earth City, Mo.

[21] Appl. No.: 774,695

[22] Filed: Oct. 9, 1991

[51] Int. Cl.$^5$ .............................. B01F 15/04
[52] U.S. Cl. ..................... 366/141; 366/156; 366/159; 406/106; 406/156
[58] Field of Search ............... 366/341, 141, 101, 150, 366/159, 156, 177, 182, 183; 406/106, 156, 157, 163, 168, 173, 181, 183

[56] References Cited

U.S. PATENT DOCUMENTS 2,688,518  9/1954  Krenke ............................ 406/168
4,284,372  8/1981  Smith ............................. 406/106

Primary Examiner—Robert W. Jenkins
Attorney, Agent, or Firm—Rogers, Howell & Haferkamp

[57] ABSTRACT

A receiver arrangement includes a bin vent for collecting ingredient dust and a multiple tee arrangement which permits the connection of a minor/micro pressure blow transfer system for dry ingredients into the major pressure blow system which transfers major ingredients into the receiver. A bottom diverter valve at the top of the receiver permits these ingredients to be directly transferred into the receiver, or to be transferred into the bin vent for addition at a later stage of the mixing process. The receiver and bin vent are supported by load cells to continuously monitor the weight of ingredients contained in the receiver/bin vent so that proper amounts of each ingredient are reliably included in each batch. Three different embodiments are disclosed.

28 Claims, 3 Drawing Sheets

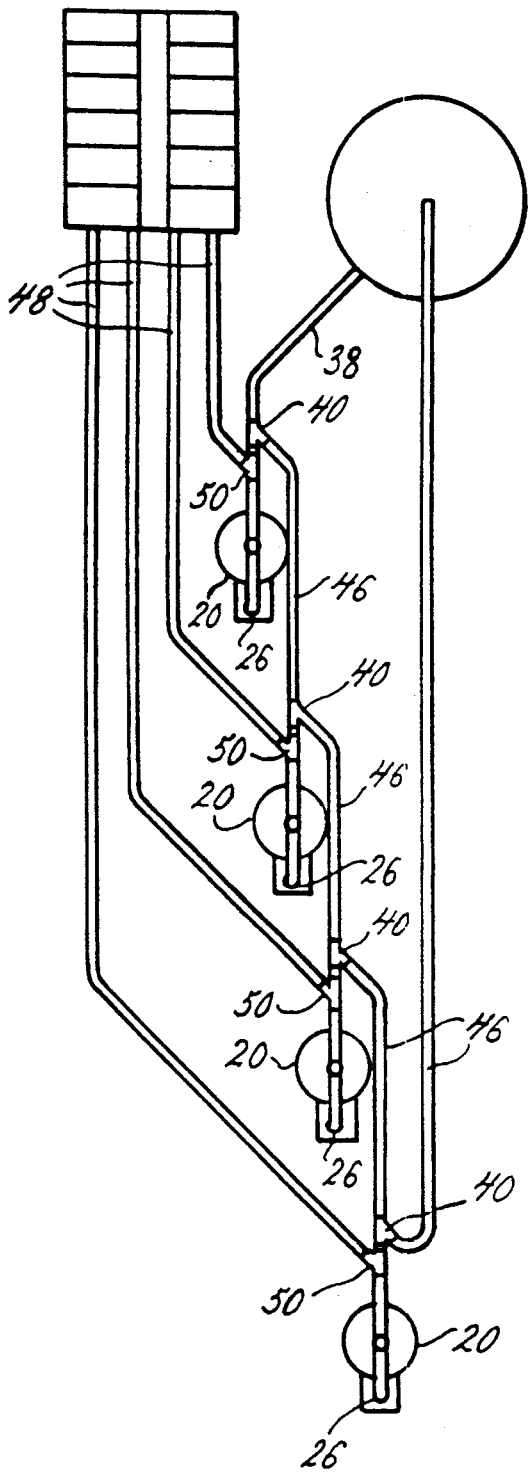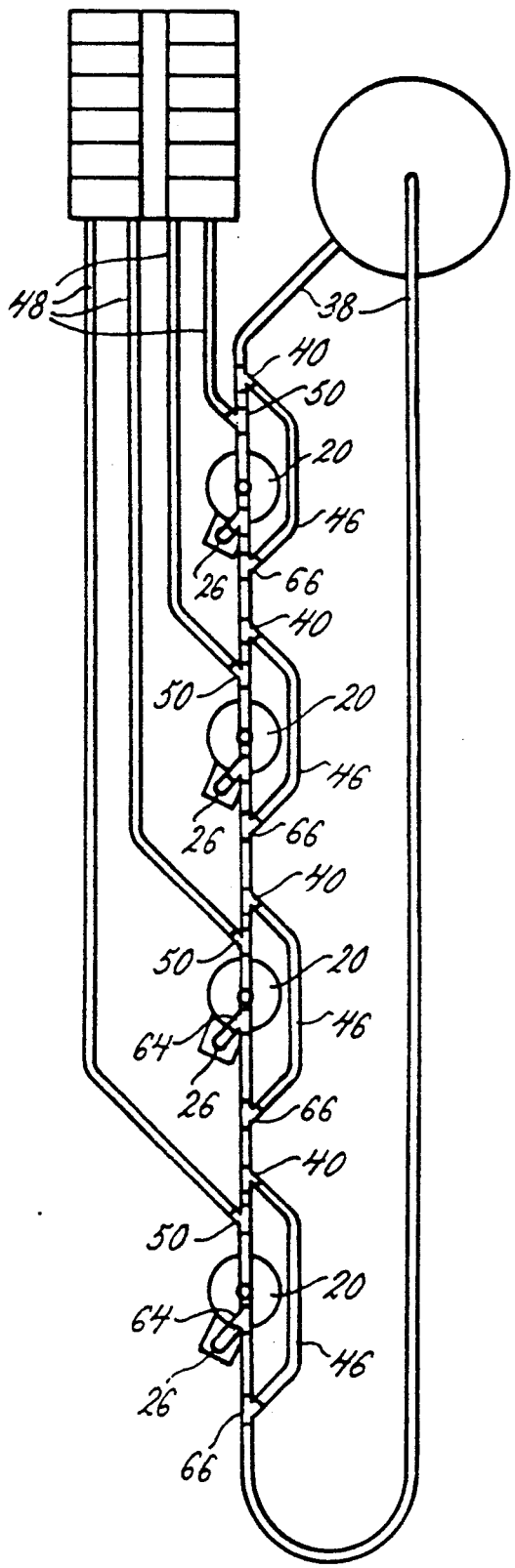
FIG. 4.
FIG. 5.

RECEIVER WITH DUST COLLECTOR FOR BULK DRY INGREDIENTS

BACKGROUND AND SUMMARY OF THE INVENTION

In many baking processes, a receiver is located immediately above a mixer for mixing a batch of dry ingredients in preparation for dumping into the mixer. Typically, the major ingredient is flour which is "pressure blown" into the mixer by a pressurized air conveyor system. In most installations, there are several mixers positioned about the plant, all of which require large quantities of flour and which are all interconnected into a single pressure blow system in a continuous loop or ring. The pneumatic conveyor tube which carries the flour in this pressure blow system is connected to a bottom diverter valve situated at the top of each receiver, the bottom diverter valve being movable from a first position which permits flour to be blown past the receiver onto the next receiver in line, and a second position which diverts the flour down into the receiver and back out into the downstream tube in order to maintain pressure connection throughout the system. Also typically, the receiver is supported by load cells or the like such that the amount of flour blown into the receiver may be measured by weight. As the flour is transferred in a pressure environment, a substantial amount of dust is created within the system but, as the system is a closed system, this dust is easily handled without problem by a single bag house or dust bin located back at the main bulk flour supply bin.

In addition to the flour ingredient which is a major ingredient, there are other ingredients which are typically added in manually to the receiver. For example, a typical batch might include 400 lbs. of flour, 50 lbs. of so-called minors, and 20 lbs. of so-called micros. As mentioned, these minors and micros are typically manually dumped into the receiver to complete the preparation of each batch.

Because these receivers are elevated above mixers which are designed to mix up 2,000 lb. doughs, in many installations the receiver virtually eliminates any additional head room in the plant. Thus, it becomes very difficult to modify the flour conveyor or pressure blow system or otherwise consider automating the addition of minors and micros to a receiver. Additionally, the pressure blowing of minors and micros into the same receivers could potentially contaminate the continuous loop flour pressure blow system with the minor/micro ingredients which, of course, would be highly undesirable. Therefore, the inventors herein were faced with significant problems in attempting to automate the addition of minors and micros to the receiver for the baking process.

In order to solve these and other problems in the prior art, and to achieve an automation which could be successfully implemented for existing plant installations, the inventors herein have designed several alternate pressure blow bulk transfer arrangements which require only minor modification to the existing flour pressure blow system and which also accommodates the automatic pressure blowing of minors and micros into the same receivers as are used with the old prior art manual process. For each of these arrangements, this includes adding a bin vent or bag house or other dust collection arrangement at each receiver which is also supported by load cells. In the first arrangement, the original flour ring pressure blow system is teed into a new minor/micro pressure blow tube which feeds the bottom diverter valve. A second tee connection in the flour pressure blow system upstream from the first tee connection bypasses the receiver for routing to the next receiver in line. Thus, flour may be blown into the receiver and the bottom diverter valve used to vent the pressure blow system into the bin vent where the flour dust is collected and the system is vented to atmosphere. In a typical "blow", approximately 8% of the dry material transferred to the receiver will be in the form of dust which passes through the receiver and is collected as dust in the bin vent. However, as both the receiver and bin vent are supported by the same assembly from load cells, the total dry material weight may be accurately ascertained. As with flour, minors and micros may be blown into the receiver with the bottom diverter valve used to vent the dust from the receiver into the same bin vent where the minor/micro dust is collected as well. A screw auger or the like at the bottom of the bin vent is conveniently used to auger the ingredient dust back into the receiver for dumping into the mixer.

In a second arrangement, a third tee-valve and a Y-connection are added downstream of the bottom diverter valve at each receiver. With this arrangement, not only are the same advantages provided as with the first arrangement, but it is also possible to convey flour and divert the dust away from the dust bin back into the flour pressure blow system as is done in the original flour ring. In this mode, flour is collected in the receiver only and no flour dust accumulates in the dust bin. If desired, selected ingredients of the minors/micros may then be blown solely into the dust bin and collected there for later addition to the baking process. While the same feature may be substantially provided in the first arrangement, as the flour blow collects flour dust in the dust bin, a small but not insubstantial quantity of flour dust is also withheld from the early part of the mixing process which, in some formulations, might present a problem. With this second arrangement, all of the measured flour may be added at the beginning of the mixing process and only selected minor/micro ingredients withheld for later addition. Therefore, with this second arrangement, even greater control over the mixing process may be attained.

In still a third arrangement, the original flour ring remains intact and a second minor/micro pressure blow system includes its own bottom diverter valve accessing the receiver and a dust bin. This arrangement provides the same advantages as explained above in connection with the second arrangement and does it without the use of any tee-valves or junctions. Instead, only a single bottom diverter valve need be added, along with a dust bin, at each receiver. This arrangement also provides the convenient optional feature mentioned above for the second arrangement. Some ingredients, such as salt, would desirably be added at an advanced stage of the mixing process and after the pre-mix has been dumped into the mixer. For these situations, the bottom diverter valve could be positioned to permit the salt (or other ingredients) to be blown past the receiver and directly into the bin vent. Then, at the advanced mixing time, the screw auger could be used to auger the salt into the mixer. In this manner, the automated system may accommodate the addition of selected ingredients at advanced stages of the mixing step.

While the principal advantages and features of the present invention have been mentioned above, a greater understanding may be attained by referring to the drawing and description of the preferred embodiment which follow.

BRIEF DESCRIPTION OF THE DRAWING

FIG. 4 is a plan view of a continuous loop configuration of a plurality of receivers as shown in FIG. 1; and FIG. 5 is a plan view of a continuous loop configuration of a plurality of receivers as shown in FIG. 2.

DETAILED DESCRIPTION OF THE PREFERRED EMBODIMENT

Figure 1:
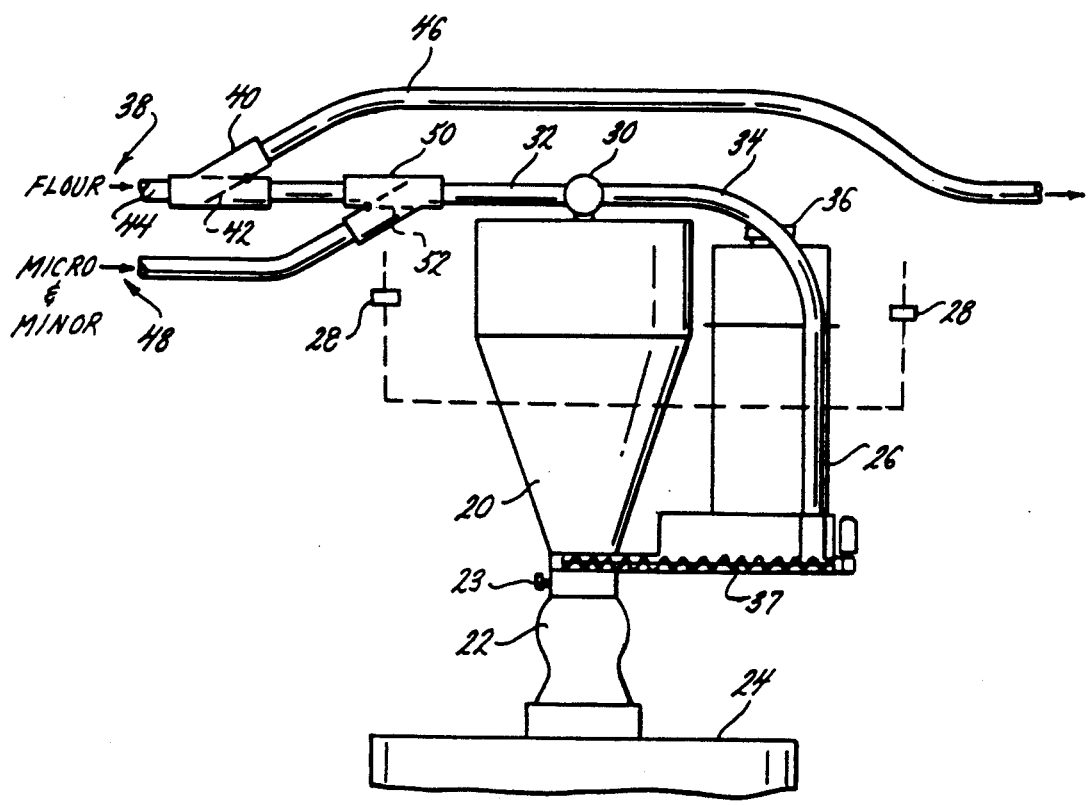
FIG. 1 is a side view of the receiver and bin vent supported by load cells above a mixer, with a pair of tee valves interconnecting the flour pressure blow system with the minor/micro pressure blow system.

As shown in FIG. 1, a receiver 20 is connected through a flexible boot 22, and flap valve 23 or the like, to the top of a mixer 24. A bin vent 26 is mounted adjacent receiver 20, both of which are supported by a pair of load cells 28 in order that the weight of the contents of the receiver and bin vent may be monitored by a computer or the like. Mounted atop receiver 20 is a bottom diverter valve 30 which may be moved into a first position wherein an entry tube 32 is directly connected to an exit tube 34. In its second position, entry tube 32 is directed into receiver 20 and exhaust from receiver 20 is directed back through valve 30 into exit tube 34. Bin vent 26 has an exhaust stack 36 to atmosphere such that exhaust from receiver 20 is ducted to the bottom of bin vent 26 and passes through the length of bin vent 26 before exiting through exhaust vent 36. The contents of bin vent 26 may be added to the receiver 20 and dumped into the mixer 24 by a screw auger 37 at any time after the receiver 20 has been emptied.

The flour pressure blow system 38 has a first tee connection 40 with a flap valve 42 which may be moved to one of two positions. In a first position, or bypass position, flap valve 42 is pivoted downwardly which connects the flour tube 44 to a bypass line 46. Bypass line 46 connects the flour blow system 38 to the next receiver (not shown) in line in a continuous loop configuration as is typically found in many plant installations. Flap valve 42 may be pivoted upwardly to its second position which directs flour from tube 44 into entry tube 32 and receiver 20. A minor/micro blow system 48 is teed into entry tube 32 by a tee 50 and flap valve 52. Flap valve 52 operates in a manner similar to flap valve 42 in that in a first downward position minor/micro blow system 48 is sealed from flour blow system 38 as when flour is being blown into receiver 20. In a second upward position, minor/micro blow system 48 is connected to inlet tube 32 to permit minor/micro ingredients to be blown into receiver 20 or, in an alternative operating mode, directly into bin vent 26.

As can be appreciated, the minor/micro pressure blow system 48 may be conveniently added to an existing installation which includes only a flour pressure blow system 38 through the addition of tees and flap valves 40, 42 and 50, 52. Also, by adding bin vent 26, the flour pressure blow system 38 may be conveniently vented to atmosphere when receiver 20 is selected for receiving flour. With this arrangement, not only will the automatic system have a reading from the particular bin from which the material is being conveyed that the right amount has been conveyed out of the bin, but also that weight will be verified with the readings taken by load cells 28 to ensure that all of the ingredient has been transferred and received at the receiver/bin vent. Should any ingredient be out of tolerance, then the operator can be notified to prevent wasting batches of improper ingredient composition which would result in bad product. Therefore, significant savings are achieved by minimizing loss of product.

Figure 2:
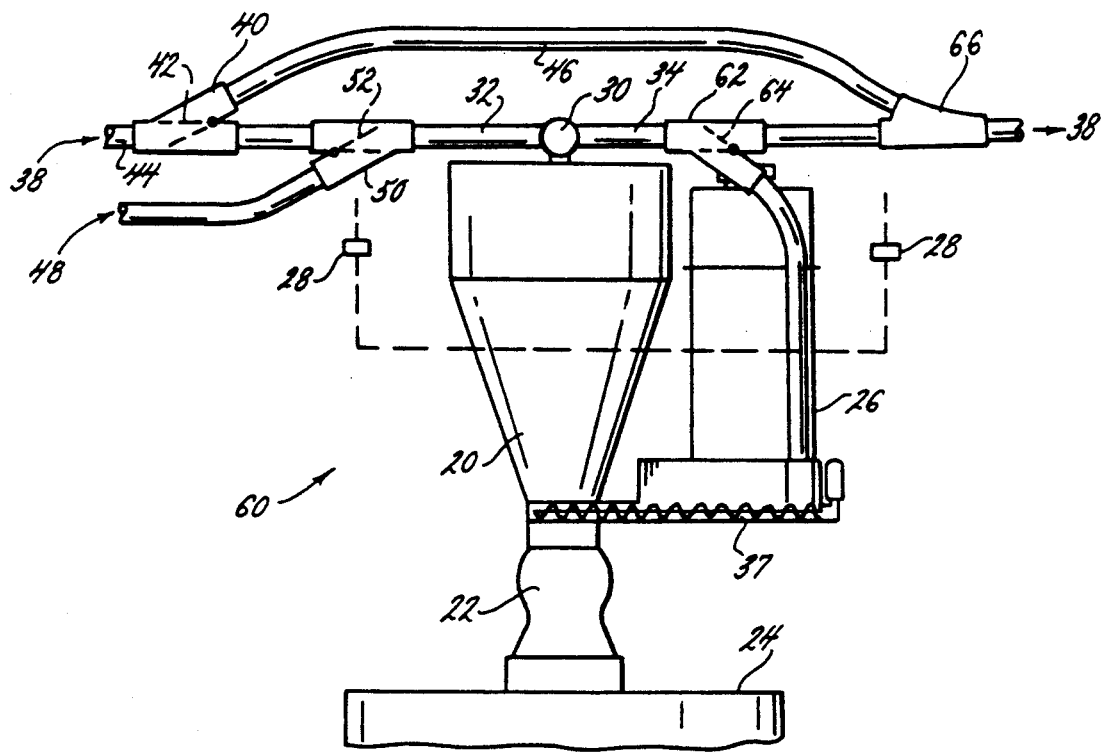
FIG. 2 is a side view of a second embodiment similar to the first embodiment except that an additional tee valve and Y-connection are added.

A second embodiment 60 is shown in FIG. 2. In addition to the same tees 40, 50 with flap valves 42, 52 as shown in the first embodiment, a third tee 62 and flap valve 64 are provided in the exit tube 34, and a Y-connector 66 routes the output of tee connector 62 back into the bypass line 46. With this arrangement, flour may be blown through the flour pressure blow system 38, and flap valve 64 may be positioned to permit flour dust to reenter the flour pressure blow system 38 through Y-connector 66 and not be accumulated in dust bin 26. With this arrangement, all of the flour comprising a single batch may be collected in receiver 20 with none of it being contained in dust bin 26 as would be the case in the first embodiment shown in FIG. 1. Then, selected minor/micro ingredients can be blown either into the receiver 20 (with their dust being collected in dust bin 26) or directly into the dust bin 26, depending upon the orientation of bottom diverter valve 30. As mentioned above, it might be desirable for some batches and mixes for salt to be blown directly into dust bin 26 for later addition to the batch. With the arrangement shown in FIG. 2, only the salt would be collected in the dust bin 26 in that all of the flour would be contained in receiver 20. As mentioned above, screw auger 37 would dump the salt through the receiver 20, flexible boot 22 and into the mixer 24.

Figure 3:
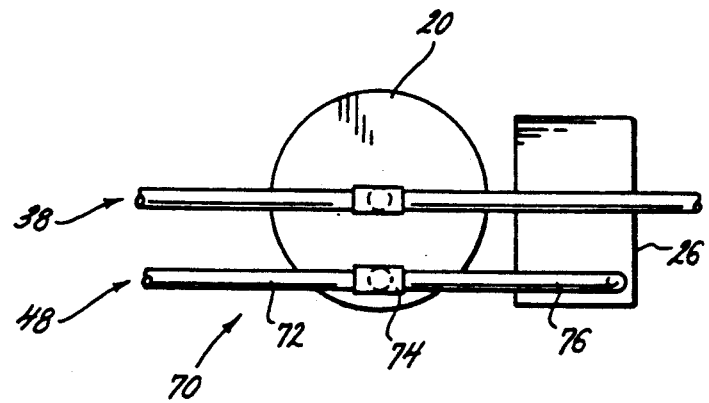
FIG. 3 is a top view of a third embodiment utilizing a separate minor/micro pressure blow system with its own bottom diverter valve.

In a third embodiment 70 shown in FIG. 3, no tee connections with flap valves or Y-connections are required. Instead, the minor/micro pressure blow system 48 has its own pneumatic conveying tube 72 connected to its own bottom diverter valve 74 with an exit tube 76 extending into dust bin 26. In this arrangement, the flour ring pressure blow system 38 typically found in an existing installation remains intact. In other words, there is no venting of the flour ring pressure blow system 38 into each of the bin vents 26 located at the various receivers 20 positioned around the plant and the single bin vent located back at the flour bulk supply bin is kept in operation. With this third embodiment, as with the second embodiment described above, selected minor/micro ingredients may be conveyed directly into the dust bin 26 located at each receiver 20 for later addition in the mixing process while all of the flour is blown directly into the receiver 20. Although not specifically shown in the drawings, it would be well understood to one of ordinary skill in the art that a minor/micro ring pressure blow system may also be stalled in parallel to the flour ring pressure blow system. The inventors presently contemplate that it would be difficult to avoid contamination problems should a wide range of ingredients be utilized. However, where these contamination problems are not present because of the compatability of the ingredients, or for other reasons, then such a minor/micro ring pressure blow system could be utilized.

As shown in FIG. 4, a plurality of receivers 20, utilizing the embodiment of the invention shown in FIG. 1, may be conveniently connected in a continuous loop configuration with the standard flour pressure blow system 38. The minor/micro blow system 48 is conveniently teed into each of the receivers 20, as in shown in FIG. 1. As shown in FIG. 5, a similar continuous loop configuration may be used to interconnect a plurality of receivers 20 as shown in FIG. 2. Again, the embodiment of the invention shown in FIG. 2 is incorporated in interconnecting the flour pressure blow system 38 and the minor/micro blow system 48 at each of the receivers 20.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A receiver for pre-mixing a bulk batch of dry ingredients for a foodstuff in a food preparation process, a bulk transfer means for transporting a bulk quantity of a first dry ingredient thereinto, said bulk transfer means being adapted for transporting said ingredient to a plurality of said receivers in a continuous loop configuration, means for collecting the dust of said ingredient created as it is transported to at least one of said receivers, a second bulk transfer means for separately transporting other dry ingredients to said receiver, said dust collection means having means for collecting the dust of said other ingredients created as they are transported to said receiver, and means for dumping said ingredients from said receiver and said dust collection means into a mixer.

2. The device of claim 1 wherein said receiver has a single entry valve through which all of said dry ingredients pass from said bulk transfer means for entry into said receiver.

3. The device of claim 2 wherein said single entry valve has means for routing said dry ingredients into said receiver and routing the exhaust including said dust from said receiver to said dust collection means.

4. The device of claim 3 wherein said single entry valve further comprises means for routing said dry ingredients directly into said dust collection means.

5. The device of claim 4 wherein said dumping means includes means for selectively conveying the contents of said dust collection means into said receiver.

6. The device of claim 1 further comprising means for weighing said receiver and said dust collection means to thereby determine the amount of each of said ingredients received at said receiver and dust collection means.

7. The device of claim 6 wherein said dust collection means comprises a bin vent, and each of said bulk transfer means comprises a pressurized air transfer system.

8. The device of claim 7 wherein each of said pressurized air transfer systems includes a tube through which said dry ingredients are transported, and wherein the tube of said second bulk transfer means is joined to the tube of said first bulk transfer means at a point proximate the receiver, and further comprising a valve at said point having means to permit either one of said bulk transfer means to transport dry material into said receiver.

9. The device of claim 8 further comprising a second joint and valve, said second joint and valve being located in said tube for said first bulk transfer means at a point further away from said receiver than said first joint and valve, said second joint and valve having means to permit said first bulk transfer means to transport dry material either to said receiver or into a bypass line to another receiver comprising said loop configuration.

10. A receiver for holding a premix of dry materials in a batch for preparation of a foodstuff in a batch processing system, said receiver having a single entry valve through which said dry material passes on its way into said receiver, a first bulk dry ingredient transfer means for transporting a first bulk dry ingredient into said receiver, a second bulk dry ingredient transfer means for transporting other bulk dry ingredients into said receiver, and means for selecting which of said transfer means has access to said receiver.

11. The device of claim 10 further comprising a dust collection means in communication with said receiver for collecting the ingredient dust created when an ingredient is transported into said receiver.

12. The device of claim 11 further comprising means for dumping the batch contained in said receiver into a mixer.

13. The device of claim 12 wherein said dumping means includes means for moving the ingredients contained in said dust collection means into said receiver.

14. The device of claim 11 wherein said dust collection means is in communication with said receiver through said single entry valve and said single entry valve has means for directing any of said dry ingredients directly into said dust collection means.

15. The device of claim 14 wherein said dust collection means comprises a bin vent, and each of said bulk transfer means comprises a pressurized air transfer system.

16. The device of claim 15 wherein each of said pressurized air transfer systems includes a tube through which said dry ingredients are transported, and wherein the tube of said second bulk transfer means is joined to the tube of said first bulk transfer means at a point proximate the receiver, and further comprising a valve at said point having means to permit either one of said bulk transfer means to transport dry material into said receiver.

17. The device of claim 16 further comprising a second joint and valve, said second joint and valve being located in said tube for said first bulk transfer means at a point further away from said receiver than said first joint and valve, said second joint and valve having means to permit said first bulk transfer means to transport dry material either to said receiver or into a bypass line to another receiver comprising said loop configuration.

18. A receiver for pre-mixing a bulk batch of dry ingredients for a foodstuff in a food preparation process, said receiver having an exhaust, a first pressurized air transfer system for transporting a first dry ingredient in bulk form into said receiver, a second pressurized air transfer system for transporting other dry ingredients in bulk form into said receiver, and means in communication with said exhaust into which ingredient dust from at least one of said air transfer systems is collected.

19. The device of claim 18 wherein said dust collecting means has means for collecting dust from ingredients transferred by both of said air transfer systems.

20. The device of claim 19 further comprising means for weighing said receiver and said dust collection means to thereby monitor and control the amount of each ingredient added thereto.

21. The device of claim 20 further comprising a single entry valve for said receiver, both of said transfer systems transporting their respective ingredients into said receiver therethrough.

22. The device of claim 21 further comprising means for dumping the contents of said receiver and said dust collection means into a mixer.

23. The device of claim 22 wherein said dumping means includes a screw conveyor at the bottom of said dust collection means for moving ingredients from said dust collection means into said receiver.

24. A receiver for pre-mixing a bulk batch of dry ingredients for a foodstuff in a food preparation process, a first bulk transfer means for transporting a bulk quantity of a first dry ingredient thereinto, said first bulk transfer means being adapted for transporting said first ingredient to a plurality of said receivers in a continuous loop configuration, a second bulk transfer means for separately transporting other dry ingredients to said receiver, means for collecting the dust of either said first ingredient or said other ingredients created as they are transferred to said receiver, means for selectively exhausting the dust of at least said first ingredient from said receiver and back into said first bulk transfer means, and means for dumping said ingredients from said receiver and said dust collection means into a mixer.

25. The device of claim 24 wherein said dust collection means comprises a bin vent, and wherein said dumping means includes means for moving dust collected in said bin vent back into said receiver before dumping into said mixer.

26. A receiver for pre-mixing a bulk batch of dry ingredients for a foodstuff in a food preparation process, a first bulk transfer means for transporting a bulk quantity of a first dry ingredient thereinto, said first bulk transfer means being adapted for transporting said first ingredient to a plurality of said receivers in a continuous loop configuration, a second bulk transfer means for separately transporting other dry ingredients to said receiver, each of said bulk transfer means having a valve associated therewith through which said associated ingredients pass before entering said receiver, means for collecting the dust of said other ingredients created as they are transported through said second bulk transfer means to said receiver, and means for dumping said ingredients from said receiver and said dust collection means into a mixer.

27. The device of claim 26 wherein said dust collection means comprises a bin vent, and wherein said dumping means includes means for moving dust collected in said bin vent back into said receiver before dumping into said mixer.

28. A receiver for pre-mixing a bulk batch of dry ingredients for a foodstuff in a food preparation process, a first bulk transfer means for transporting a bulk quantity of a first dry ingredient thereinto, said first bulk transfer means being adapted for transporting said first ingredient to a plurality of said receivers in a continuous loop configuration, a second bulk transfer means for separately transporting other dry ingredients to said receiver, means for collecting the dust of at least said other ingredients as they are transferred to said receiver by said second bulk transfer means, means for selectively transferring at least some of said other ingredients only into said dust collection means and not into said receiver, means for dumping said receiver into a mixer, and means for dumping said dust collection means into the mixer.

* * * * *